United States Patent

Takahashi et al.

[11] Patent Number: 5,604,513
[45] Date of Patent: Feb. 18, 1997

[54] SERIAL SAMPLING VIDEO SIGNAL DRIVING APPARATUS WITH IMPROVED COLOR RENDITION

[75] Inventors: Seiki Takahashi; Hayato Takasago; Toshio Tobita, all of Tokyo; Hiroaki Ishitani; Takatomo Watanabe, both of Nagaokakyo; Hiroaki Ideno, Amagasaki; Mitiyasu Nounen, Sanda, all of Japan

[73] Assignee: Mitsubishi Denki Kabushiki Kaisha, Tokyo, Japan

[21] Appl. No.: 203,620

[22] Filed: Feb. 28, 1994

Related U.S. Application Data

[63] Continuation of Ser. No. 904,596, Jun. 26, 1992, abandoned.

[30] Foreign Application Priority Data

Jun. 27, 1991 [JP] Japan .................................. 3-156492

[51] Int. Cl.⁶ .................................................. G09G 5/02
[52] U.S. Cl. ............................. 345/153; 345/88; 345/22
[58] Field of Search ................................ 345/150, 151, 345/153, 22, 88, 112, 186, 199, 213; 358/324, 325, 337, 339; 348/537

[56] References Cited

U.S. PATENT DOCUMENTS

| | | | |
|---|---|---|---|
| 4,121,283 | 10/1978 | Walker | 345/115 |
| 4,600,274 | 7/1986 | Morozumi | 340/703 |
| 4,600,945 | 7/1986 | Bolger | 358/325 |
| 4,716,403 | 12/1987 | Morozumi | 340/701 |
| 4,745,406 | 5/1988 | Hayashi et al. | 340/784 |

FOREIGN PATENT DOCUMENTS

| | | | |
|---|---|---|---|
| 59-211087 | 11/1984 | Japan . | |
| 6119290 | 1/1986 | Japan . | |
| 0234897 | 9/1989 | Japan . | |
| 1272389 | 10/1989 | Japan . | |
| 8601624 | 3/1986 | WIPO | 340/784 |

*Primary Examiner*—Richard Hjerpe
*Assistant Examiner*—Lun-Yi Lao

[57] ABSTRACT

A serial sampling video signal driving apparatus receives a plurality of color video signals. A serial sampling video driver samples the color video signals one after the other in cyclic fashion, and provides the sampled values to drive a matrix-type color display. A delay circuit delays one or more of the color video signals at different phases before input to the serial sampling video driver, thereby compensating for differences in sampling times.

18 Claims, 6 Drawing Sheets

SERIAL SAMPLING VIDEO SIGNAL DRIVING APPARATUS WITH IMPROVED COLOR RENDITION

This application is a continuation of application Ser. No. 07/904,596 filed on Jun. 26, 1992, now abandoned.

BACKGROUND OF THE INVENTION

This invention relates to serial sampling video signal driving apparatus for a matrix-type color display.

A matrix-type display comprises a matrix of discrete picture elements, herein called dots. In the case of a color display, each dot has means for displaying, for example, the three primary colors red, blue, and green. The serial sampling video signal driving circuit receives red, blue, and green input video signals, samples them in a serial manner, and provides video output signals to drive the display. "A serial manner" means that the three video signals are sampled one after the other instead of simultaneously.

One example of a matrix-type color display with a serial sampling video signal driving circuit is a color liquid crystal display for a computer. The computer produces red, green, and blue video signals synchronized to a dot clock.

Although the video signals are analog and since they are produced by a computer, each signal tends to have a discrete value per dot, the value changing abruptly at boundaries between dots. A problem that occurs in tills situation is incorrect color rendition at high spatial frequencies because signal sampling is not synchronized to the dot clock. A vertical edge between a white area and a black area, for example, may be tinged with undesired colors. This problem is particularly noticeable if the serial sampling video signal driving apparatus and its constituent signal-processing circuits are not designed for extremely high-frequency operation. The problem can be alleviated by using circuits with improved high-frequency characteristics, but such circuits are expensive and dissipate additional power.

SUMMARY OF THE INVENTION

It is accordingly an object of the present invention to improve color rendition in color displays.

Another object of the invention is to enable a color display to be driven using low-cost components.

Still another object of the invention is to enable a color display to be driven using low-power components.

The serial sampling video signal driving apparatus of the present invention receives a plurality of color video signals. A serial sampling means samples the color video signals one after the other in cyclic fashion, and provides the sampled values to drive a matrix-type color display. A delay means delays one or more of the color video signals in phase before input to the serial sampling means, thereby compensating for differences in sampling times in the sampling means.

DETAILED DESCRIPTION OF THE INVENTION

The present invention will be described with reference to the attached drawings. The drawings illustrate the invention but do not limit its scope, which should be determined from the appended claims.

Figure 1:
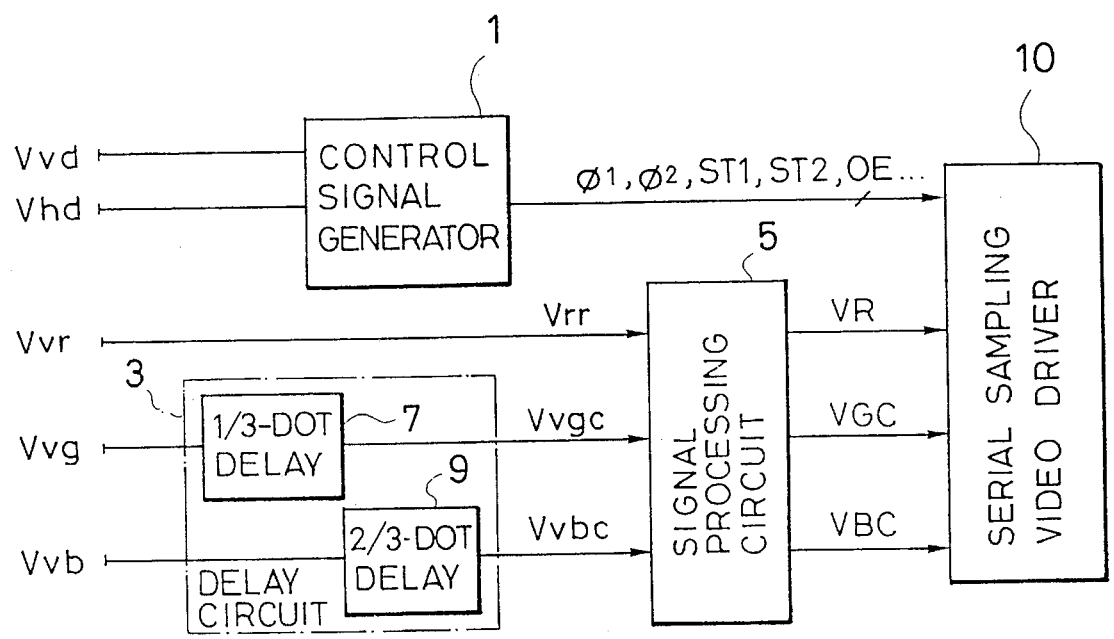
FIG. 1 is a block diagram of a novel serial sampling video signal driving apparatus.

Referring to FIG. 1, the serial sampling video signal driving apparatus of the present invention comprises a control signal generator 1, a delay circuit 3, a signal processing circuit 5, and a serial sampling video driver 10. A vertical synchronization signal Vvd, a horizontal synchronization signal Vhd, and red, green, and blue analog video signals Vvr, Vvg, and Vvb are inputted from a device such as a computer. The serial sampling video driver 10 provides output signals to a connected color display, as illustrated later.

The control signal generator 1 receives the synchronization signals Vvd and Vhd and generates sampling clock signals $\phi_1$ and $\phi_2$, start pulses ST1 and ST2, an output enable signal OE, and other necessary control signals for input to the serial sampling video driver 10. Details will be omitted since control signal generators are well known to those skilled in the art.

The delay circuit 3, which is a novel feature of the invention, comprises a ⅓-dot delay line 7 and a ⅔-dot delay line 9. The ⅓-dot; delay line 7 receives the green analog video input signal Vvg and delays it by an amount equal to one-third the period of the dot clock to produce a phase-compensated green analog video input signal Vvgc. The ⅔-dot delay line 9 receives the blue analog video input signal Vvb and delays it by an amount equal to two-thirds the period of the dot clock to produce a phase-compensated blue analog video input signal Vvbc.

The dot clock is a clock signal, not indicated in the drawing, that has a period equal to the interval between the display of successive dots. As will be shown later, the period of the dot clock is 1.5 times the period of the sampling clock signals $\phi_1$ and $\phi_2$.

The signal processing circuit 5 receives the red analog video input signal Vvr and the phase-compensated green and blue video input signals Vvgc and Vvbc, performs operations such as polarity inversion, amplification, and gamma correction, and generates red, green, and blue video signals VR, VGC, and VBC. The green and blue signals VGC and VBC inherit the phase corrections that were applied by the delay circuit 3. Details of the operation of the signal processing circuit 5 will be omitted since this circuit is well known.

The serial sampling video driver 10 receives the video signals VR, VGC, and VBC From the signal processing circuit 5 and control signals such as $\phi_1$, $\phi_2$, ST1, ST2, and OE from the control signal generator 1, and generates signals that drive a color display. The structure of the serial sampling video driver 10 will be briefly described next.

Figure 2:
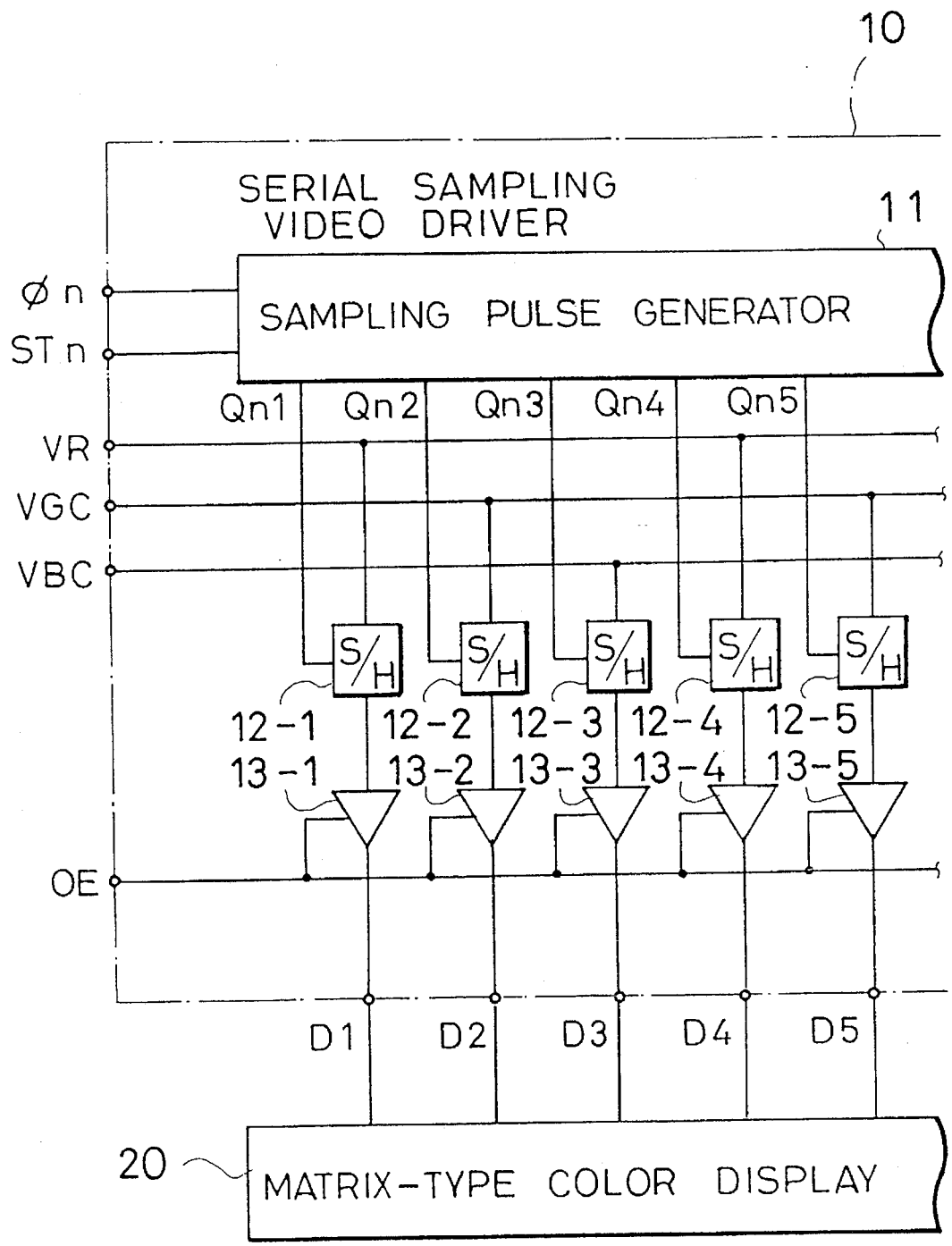
FIG. 2 is a schematic diagram of the serial sampling video driver in FIG. 1.

The serial sampling video driver 10 comprises a pair of identical circuits, one of which is shown In FIG. 2. This circuit has a sampling pulse generator 11, a plurality of sample-and-hold circuits 12-1, 12-2, ..., and a corresponding plurality of buffer amplifiers 13-1, 13-2, ... coupled to output terminals D1, D2, .... The output terminals D1, D2, ... are coupled to a matrix-type color display. One of the two identical circuits receives the clock and start signals $\phi_1$ and ST1, while the other receives the clock and start signals $\phi_2$ and ST2. The clock and start signals in FIG. 2 are accordingly designated $\phi_n$ and STn (n=1 or 2).

The sampling pulse generator 11 is a shift register that receives an STn pulse signal and shifts it according to the $\phi_n$ clock signal to generate a series of pulse outputs Qn1, Qn2, .... These are supplied to the sample-and-hold circuits 12-1, 12-2, ....

The sample-and-hold circuits 12-1, 12-2, ... are connected in a cyclic sequential order to the VR, VGC, and VBC signal lines. When the m-th sample-and-hold circuit 12-m receives a pulse signal Qnm, it closes an internal sampling gate and holds the current value of the VR, VGC, or VBC signal.

The buffer amplifiers 13-1, 13-2, ... all receive the output enable signal OE. When activated by this signal, they amplify the values held in the sample-and-hold circuits 12-1, 12-2, ... and output these values to the output terminals D1, D2, .... OE is activated at regular intervals, such as once per period of the horizontal synchronization signal Vhd.

Figure 3:
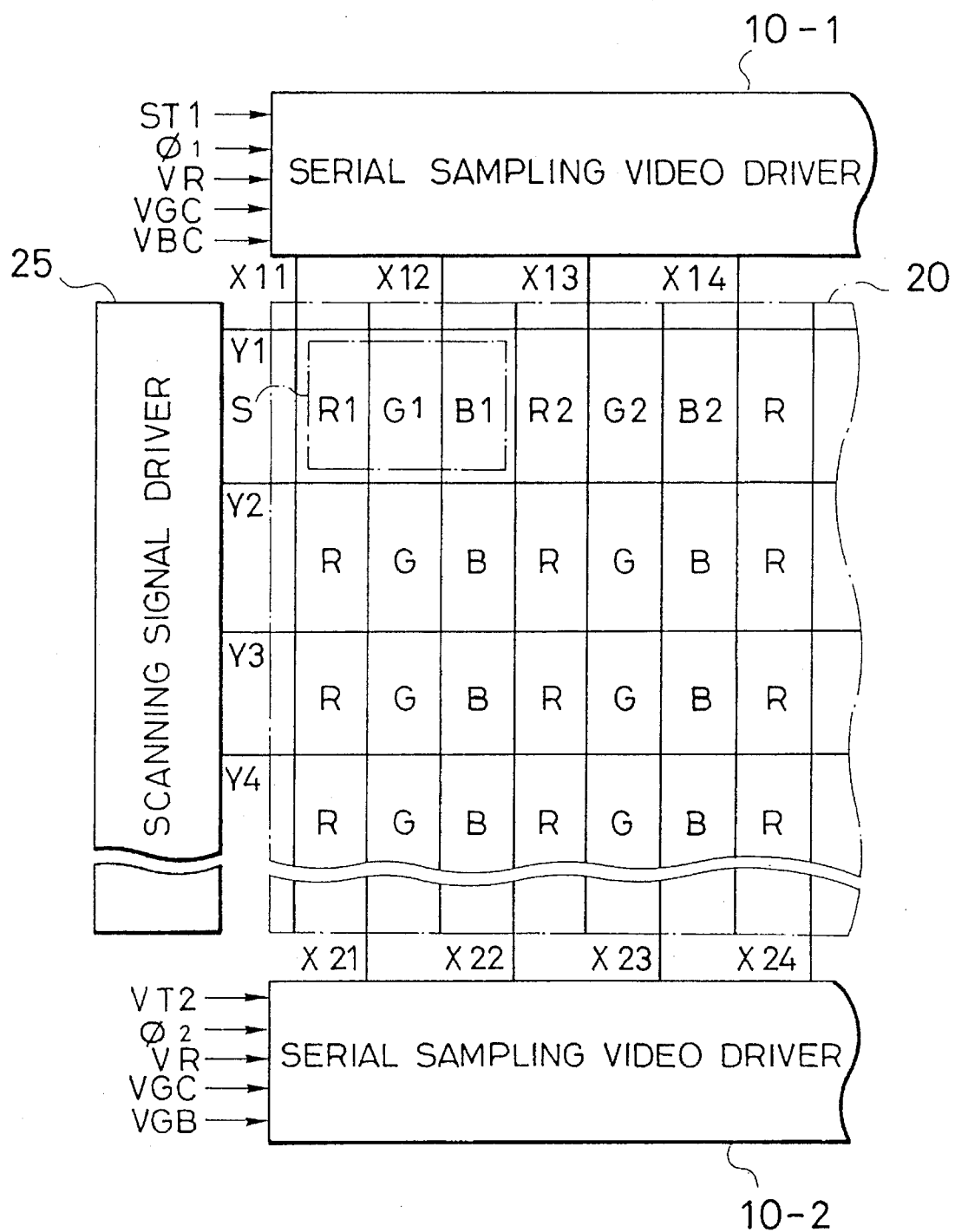
FIG. 3 is a plan view of a liquid crystal display and its driving circuits.

Referring to FIG. 3, the color display 20 is in this case a color liquid crystal display with a red-green-blue stripe arrangement. The color display 20 is divided into a matrix of rectangular sub-regions labeled with the letters R, G, and B in the drawing, which are driven by video signal lines X and scanning signal lines Y. Color filters (not shown in the drawing) enable sub-regions marked R, G, and B to display respective colors red, green, and blue. A single dot S comprises three adjacent sub-regions displaying different colors, such as the sub-regions R1, G1, and B1.

The video signal lines X11, X12, ... are driven by a serial sampling video driver 10-1 of the type in FIG. 2. The video signal lines X21, X22, ... are driven by another, identical serial sampling video driver 10-2. The video signal lines X11, X12, ... are interleaved with the video signal lines X21, X22, ... as shown in the drawing. The scanning signal lines Y1, Y2, ... are driven by a scanning signal driver 25, details of which will be omitted since they are well known.

Applications of the invention are not limited to the arrangement shown in FIG. 3. For example, the color display 20 may have a mosaic layout of red, green, and blue elements instead of a stripe layout.

Next the operation of the novel serial sampling video signal driving apparatus will be explained. The case of alternating black and white dots will be shown. The normally-black mode of operation (black when no voltage is applied) with reverse driving in alternate frames will be assumed.

Figure 4:
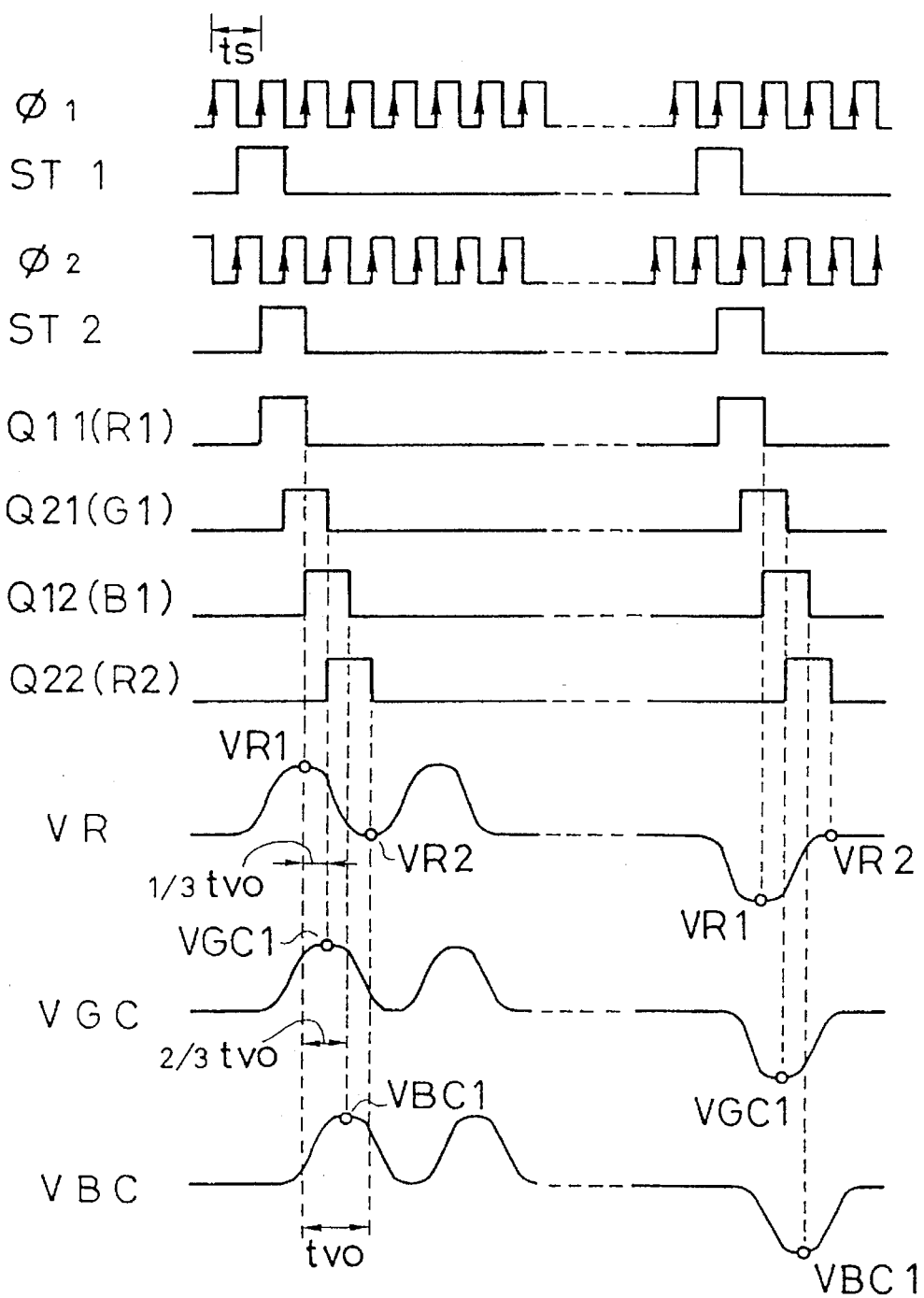
FIG. 4 is a timing diagram illustrating the operation of the serial sampling video signal driving apparatus in FIG. 1.

Referring to FIG. 4, the clock signals $\phi_1$ and $\phi_2$ have complementary phases. The start pulses ST1 and ST2 have a duration of one sampling clock period is, from one falling edge to the next falling edge of their respective clock signals $\phi_1$ and $\phi_2$. The sampling pulse generator 11 in the serial sampling video driver 10-1 produces sampling pulses Q11, Q12, ... synchronized with successive rising edges of $\phi_1$. Interleaved with these, the sampling pulse generator 11 in the serial sampling video driver 10-2 produces sampling pulses Q21, Q22, ... synchronized with successive rising edges of $\phi_2$.

Since alternate black and white dots are being displayed, the original analog video signals Vvr, Vvg, and Vvb are identical square waves, all three signals going high and low simultaneously. The processed video signals VR, VGC, and VBC also have the form of square waves, but due to the delay circuit 3, VGC and VBC are delayed with respect to VR as shown in FIG. 4.

If the signal processing circuit 5 and the serial sampling video driver 10 have superlative high-frequency characteristics, the square waveform can be fairly closely maintained in VR, VGC, and VBC. Here, however, it will be assumed that the signal processing circuit 5 and serial sampling video driver 10 are low-cost, low-power parts with more ordinary characteristics. Consequently, the video signals VR, VGC and VBC have the heavily rounded waveforms shown in FIG. 4.

Sampling gates In the sample-and-hold circuits 12-1, 12-2, ... close on the falling edges of the sampling pulses Q11, Q21, Q12, Q22, .... The red video signal VR is sampled on the falling edge of Q11 at time VR1, the falling edge of Q22 at time VR2, and so on.

Since each of the three video signals VR, VGC, and VBC is sampled once per dot, the dot clock period (denoted tvo in the drawing) is three times the interval between successive sampling pulses. Since the sampling pulses are interleaved, the dot clock period (tvo) is 1.5 times the sampling clock period (denoted ts), as mentioned earlier.

The green video signal VGC is sampled at the falling edge of Q21 at time VGC1, which follows VR1 by one half sampling clock period (0.5ts). This is one-third of the dot clock period (0.5ts=⅓×1.5ts=⅓×tvo). Since VGC is delayed by just this amount with respect to VR in the delay circuit 3, both signals are sampled at the same point points on their respective waveforms.

Similarly, the blue video signal VBC is sampled on the falling edge of Q12 at time VBC1, which follows VR1 by one sampling clock period is, which is equal to ⅔×tvo. Since VBC is delayed by two-thirds of the dot clock period in the delay circuit 3, VBC is also sampled at time same point on its waveform as were VR and VBC.

Since all three video signals are sampled at similar points (VR1, VG1, VB1) on their respective waveforms, the result is a pure white dot in which the three primary colors are equally represented. Similarly, the next dot will be pure black. In the next frame the video waveforms are inverted but the timing relations are the same, resulting in the same pure black and white.

Figure 5:
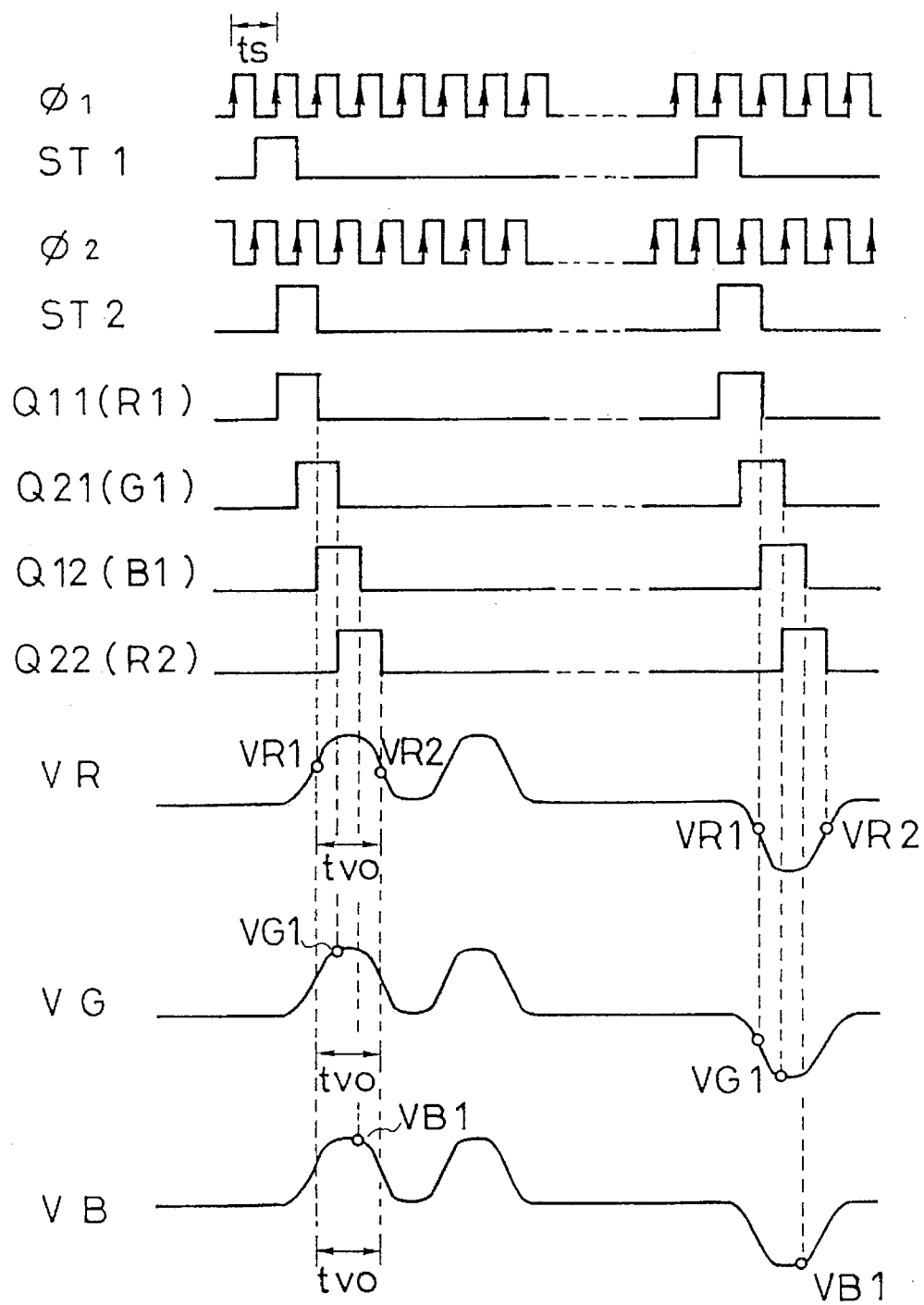
FIG. 5 is a timing diagram illustrating the operation of a prior-art serial sampling video signal driving apparatus.

The effect of the invention can be seen by comparing FIG. 4 with FIG. 5, which shows the operation of a prior-art serial sampling video signal driving apparatus lacking the delay circuit 3. In this case the video signals VR, VG, and VB input to the serial sampling video driver 10 have the same phase. Due to the different sampling times, they are sampled at different points (e.g. VR1, VG1, and VB1) on their waveforms. In this case white dots will exhibit a bluish-green tinge, while black dots will be tinged with red.

Figure 6:
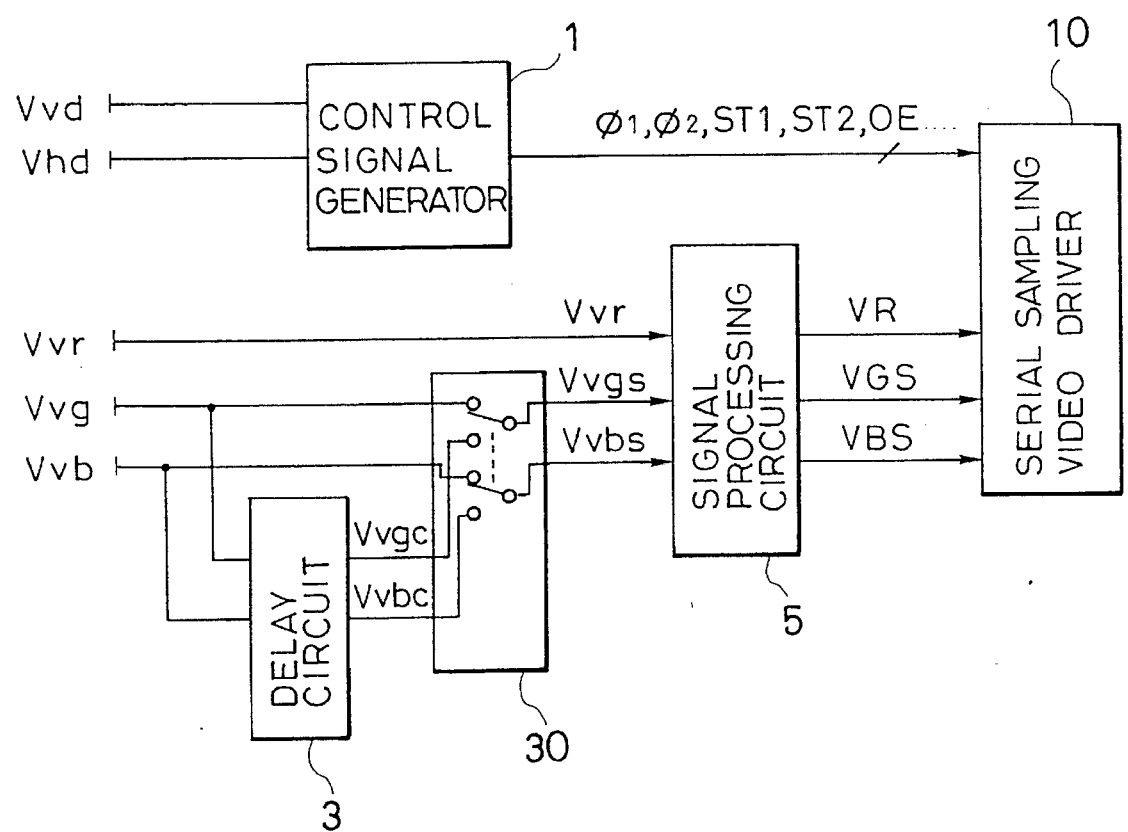
FIG. 6 is a block diagram of another novel serial sampling video signal driving apparatus.

FIG. 6 shows another novel serial sampling video signal driving apparatus. Elements common to FIG. 1 have the same reference numerals, and descriptions of these elements will be omitted. The new element is a signal switching circuit 30 coupled between the delay circuit 3 and the signal processing circuit 5. The delay circuit 3 selects either the original analog video input signals Vvg and Vvb or the phase-compensated signals Vvgc and Vvbc, and supplies the selected signals as inputs Vvgs and Vvbs to the signal processing circuit 5. The signal processing circuit 5 processes Vvr, Vvgs, and Vvbs, and supplies the resulting processed video signals VR, VGS, and VBS to the serial sampling video driver 10.

When this serial sampling video signal driving apparatus is connected to a computer or other device that produces analog video input signals Vvr, Vvg, and Vvb with substantially discrete values synchronized to a dot clock, the signal switching circuit 30 is set to select the phase-compensated signals Vvgc and Vvbc, and the serial sampling video signal driving apparatus operates as illustrated FIG. 5.

When the connected video source is a television receiver, video tape recorder, or other device that produces continuous video signals without distinct dot boundaries, the signal switching circuit 30 is set to select Vvg and Vvb. Operation is then as illustrated in FIG. 5. This setting may produce defects in color rendition if high spatial chrominance frequencies are encountered, but it enables luminance information to be reproduced more faithfully.

As will be apparent to those skilled in the art, the apparatus shown in the drawings can be modified in various ways without departing from the spirit and scope of the invention. For example, instead of delaying the green and blue signals with respect to the red signal, it is equally possible to delay the red and blue signals with respect to the green signal, or the red and green signals with respect to the blue signal. Moreover, the invention is not limited to these three primary colors; it can use a different set of colors, the number of which need not be three. The serial sampling video driver need not comprise two identical circuits as in FIG. 3; it may have a single circuit, or more crystal display; the invention is applicable to other types of displays as well.

What is claimed is:

1. A serial sampling video signal driving apparatus that receives a plurality of different color video signals in order to drive a matrix-type color display, comprising:

serial sampling means for simultaneously receiving the plurality of different color video signals, for sampling the plurality of different color video signals in a cyclic fashion, and for providing sampled values to the matrix-type color display; and delay means, coupled to said serial sampling means, for delaying at least one of the plurality of different color video signals before being inputted to said serial sampling means, so said sampling means simultaneously receives the plurality of different color video signals at different phases and samples the plurality of color video signals at the same phase, thereby compensating for differences in sampling times in said serial sampling means;

wherein said delay means leaves a first color video signal among said plurality of different color video signals undelayed, and delays successive remaining color video signals among said plurality of different color video signals by an amount equal to a sampling time difference between the successive remaining color video signals among said plurality of different color video signals.

2. The apparatus of claim 1, wherein said plurality of different color video signals are three color video signals, said three color video signals being synchronized with a dot clock having a period.

3. The apparatus of claim 2, wherein said delay means leaves one of said three color video signals undelayed, delays another of said three color video signals by one-third of said period, and delays another of said three color video signals by two-thirds of said period.

4. The apparatus of claim 2, wherein said three color video signals correspond to red, green, and blue.

5. The apparatus of claim 1, further comprising signal switching means for selectively decoupling said delay means from said serial sampling means and allowing all of said plurality of different color video signals to be input to said serial sampling means without phase delay.

6. A serial sampling video signal driving method that processes a plurality of different color video signals in order to drive a matrix-type color display, comprising the steps of:

(a) delaying at least one of the plurality of different color video signals;

(b) simultaneously receiving the plurality of different color video signals at different phases;

(c) sampling the plurality of different color video signals at the same phase in a cyclic fashion; and (d) providing sampled values to the matrix-type color display;

wherein said step (a) compensates for differences in sampling times of said step (c);

wherein said step (a) leaves a first color video signal among the plurality of different color video signals undelayed and delays successive remaining color video signals of the plurality of different color video signals by an amount equal to a sampling time difference between the successive remaining color video signals among of the plurality of different color video signals.

7. The method of claim 6, wherein the plurality of different color video signals are three color video signals, the three color video signals being synchronized with a dot clock having a period.

8. The method of claim 7, wherein said step (a) leaves one of the three color video signals undelayed, delays another of the three color video signals by one-third of the certain period, and delays a third of the three color video signals by two-thirds of the certain period.

9. The method of claim 7, wherein the three color video signals correspond to red, green, and blue.

10. The method of claim 6 further comprising the step of:

(e) selectively bypassing said step (a) to allow all of the plurality of different color video signals to be sampled without phase delay.

11. A serial sampling video signal driving apparatus that receives a first video signal, a second video signal and a third video signal in order to drive a matrix-type color display, comprising:

serial sampling means for simultaneously receiving a fourth video signal, a fifth video signal and a sixth video signal at different phases, for successively sampling the fourth through sixth video signals at the same phase in a cyclic fashion at predetermined intervals, and for providing sampled values to said matrix-type color display, the predetermined intervals being sampling time differences between a sampling time of said fourth video signal and a sampling time of the fifth video signal and between the sampling time of the fifth video signal and a sampling time of the sixth video signal; and delay means for simultaneously receiving the first video signal, the second video signal and the third video signal at the same phase, for generating a delayed second signal by delaying the second video signal and a delayed third video signal by delaying the third video signal, and for generating the fourth video signal from the first video signal, the fifth video signal from the delayed second video signal and the sixth video signal from the delayed third video signal, before the fourth through sixth video signals are input to said serial sampling means, thereby compensating for said sampling time differences in said serial sampling means;

wherein said delay means generates the fourth video signal by leaving the first video signal undelayed, generates the fifth video signal by delaying the second video signal by an amount equal to the sampling time differences, and generates the sixth video signal by delaying the third video signal by an amount equal to twice the sampling time differences.

12. The apparatus of claim 11, wherein the first video signal, the second video signal, and the third video signal are color video signals, the three color video signals being synchronized with a dot clock having period.

13. The apparatus of claim 12, wherein the three color video signals correspond to red, green, and blue.

14. The apparatus of claim 11, further comprising signal switching means for selectively decoupling said delay means from said serial sampling means and allowing all of the first video signal, the second video signal and the third video signal to be input to said serial sampling means without phase delay.

15. A serial sampling video signal driving method that receives a first video signal, a second video signal and a third video signal in order to drive a matrix-type color display, comprising the steps of:

(a)(1) simultaneously receiving a fourth video signal, a fifth video signal and a sixth video signal at different phases, (a)(2) successively sampling the fourth through sixth video signals at the same phase in a cyclic fashion at predetermined intervals, (a)(3) providing sampled values to the matrix-type color display, the predetermined intervals being sampling time differences between a sampling time of the fourth video signal and a sampling time of the fifth video signal and between the sampling time of the fifth video signal and a sampling time of the sixth video signal; and (b) simultaneously receiving the first video signal, the second video signal and the third video signal and generating a delayed second signal by delaying the second video signal and a delayed third video signal by delaying the third video signal, and generating the fourth video signal from the first video signal, the fifth video signal from the delayed second video signal and the sixth video signal from the delayed third video signal, before the fourth through sixth video signals are received in said step (a)(1), thereby compensating for the sampling time differences in said step (a)(3);

wherein said step (b) generates the fourth video signal by leaving the first video signal undelayed, generates the fifth video signal by delaying the second video signal by an amount equal to the sampling time differences, and generates the sixth video signal by delaying the third video signal by an amount equal to twice the sampling time differences.

16. The method of claim 15, wherein said first video signal, said second video signal, and said third video signal are color video signals, said three color video signals being synchronized with a dot clock having period.

17. The method of claim 16, wherein the three color video signals correspond to red, green, and blue.

18. The method of claim 15 further comprising the step of:

(c) selectively bypassing said step (b) to allow the first video signal, the second video signal and the third video signal to be sampled without phase delay.

* * * * *